US008559797B2

(12) United States Patent
MacInnis

(10) Patent No.: US 8,559,797 B2
(45) Date of Patent: *Oct. 15, 2013

(54) SYSTEM AND METHOD FOR PERSONAL VIDEO RECORDING

(75) Inventor: Alexander G. MacInnis, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1315 days.

This patent is subject to a terminal disclaimer.

(21) Appl. No.: 11/616,681

(22) Filed: Dec. 27, 2006

(65) Prior Publication Data

US 2007/0110391 A1    May 17, 2007

Related U.S. Application Data

(63) Continuation of application No. 09/974,427, filed on Oct. 9, 2001, now Pat. No. 7,177,522.

(60) Provisional application No. 60/239,425, filed on Oct. 10, 2000.

(51) Int. Cl.
*H04N 5/783* (2006.01)
*H04N 5/90* (2006.01)

(52) U.S. Cl.
CPC .................................. *H04N 5/783* (2013.01)
USPC ........... 386/345; 386/241; 386/343; 386/356; 725/90

(58) Field of Classification Search
CPC .................................................... H04N 5/783
USPC ......... 386/46, 68, 81, 82, 111, 112, 124–126, 386/239, 248, 326–334, 343–348, 314; 725/88–90, 102, 54, 114; 375/240, 375/240.27; 348/466
See application file for complete search history.

(56) References Cited

U.S. PATENT DOCUMENTS

| 5,377,051 | A | * | 12/1994 | Lane et al. | .................... 386/314 |
| 5,568,200 | A | * | 10/1996 | Pearlstein et al. | ....... 375/240.27 |
| 5,838,876 | A | * | 11/1998 | Iwamura | ........................ 386/125 |
| 5,862,295 | A | * | 1/1999 | Shimoda et al. | ................ 386/68 |
| 5,887,110 | A | * | 3/1999 | Sakamoto et al. | ............. 386/68 |
| 6,023,553 | A | * | 2/2000 | Boyce et al. | .................. 386/329 |
| 6,047,101 | A | * | 4/2000 | Kawamura et al. | ............ 386/68 |
| 6,400,886 | B1 | * | 6/2002 | Brewer et al. | ................... 386/52 |
| 6,418,269 | B1 | * | 7/2002 | Rijckaert | ........................ 386/68 |

(Continued)

FOREIGN PATENT DOCUMENTS

JP          2002027409       *    5/2000

*Primary Examiner* — Thai Tran
*Assistant Examiner* — Mishawn Dunn
(74) *Attorney, Agent, or Firm* — Thomas | Horstemeyer, LLP

(57) ABSTRACT

A system and method for personal video recording (PVR) is provided for recording digitally encoded streams, and for playing back and decoding the recorded streams. The PVR system may receive the digitally encoded streams from a digital cable box or a network server. The system enables trick modes including fast forward and reverse mode displays at various speeds. The system an method for PVR may also be applied to digitally encoded streams without I-pictures, such as, for example, progressive refresh streams or HITS streams. Reverse decode and display may be implemented by starting at a suitable entry point, decoding quickly up to the point of the desired picture, and displaying the result, and repeating the process. Index tables of entry points may be used for proper operation in some modes where the entry points are entry pictures (E-pictures) which start a pattern of progressively refreshing I-slices.

28 Claims, 8 Drawing Sheets

(56) References Cited

U.S. PATENT DOCUMENTS

| | | |
|---|---|---|
| 6,434,195 B1 * | 8/2002 | Luthra et al. .............. 375/240.12 |
| 6,481,012 B1 * | 11/2002 | Gordon et al. .................. 725/54 |
| 6,549,717 B2 * | 4/2003 | Mishima et al. ................ 386/68 |
| 6,570,922 B1 * | 5/2003 | Wang et al. .............. 375/240.12 |
| 6,724,819 B1 * | 4/2004 | Takaki et al. ............. 375/240.12 |
| 6,750,888 B1 * | 6/2004 | Nakagawa ..................... 715/800 |
| 7,046,910 B2 * | 5/2006 | Chen et al. ..................... 386/345 |
| 7,743,400 B2 * | 6/2010 | Kurauchi ....................... 725/114 |

* cited by examiner

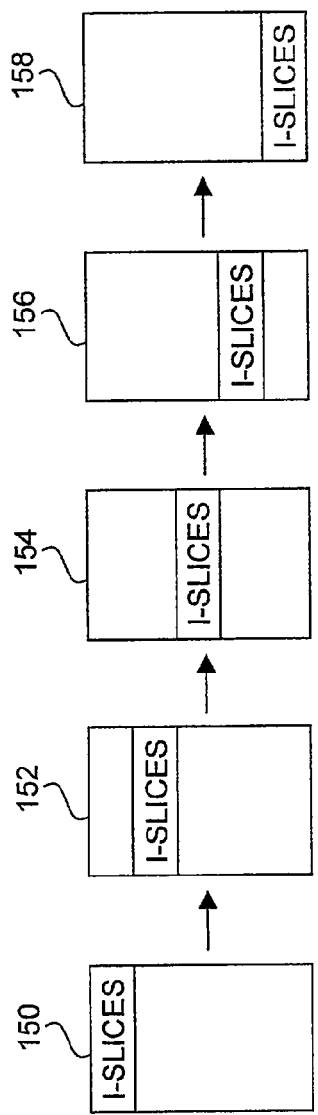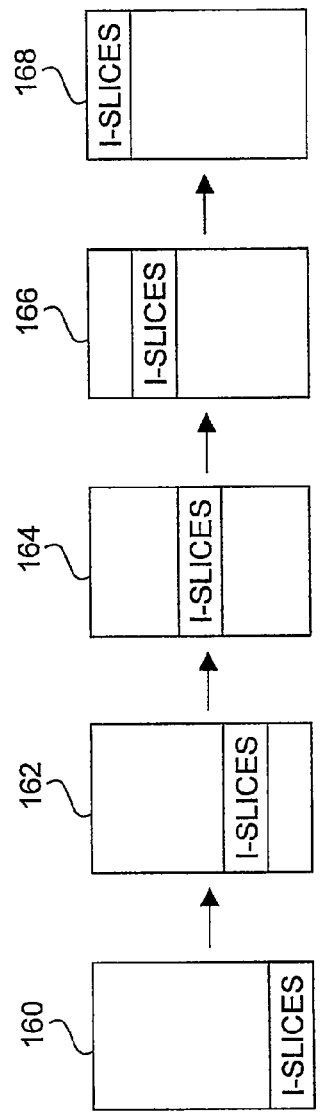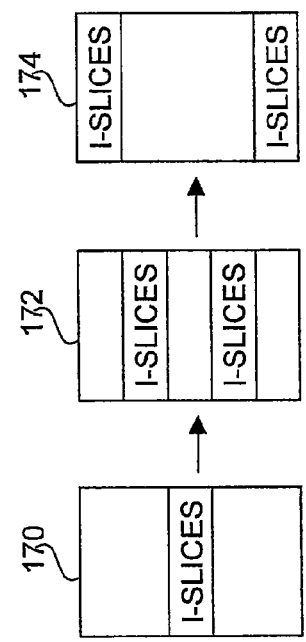

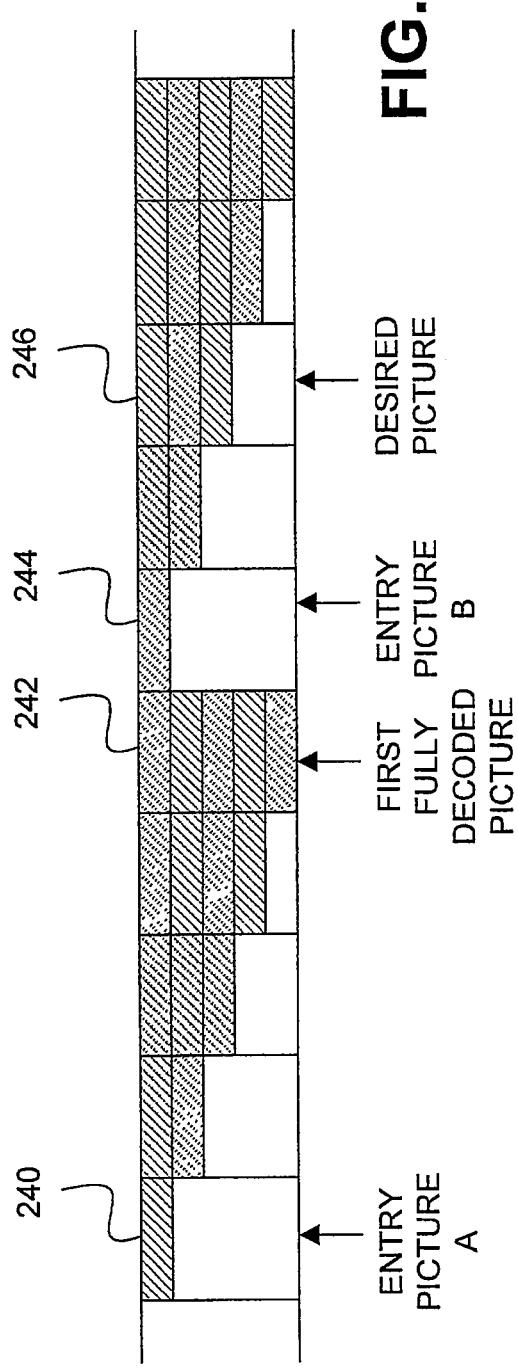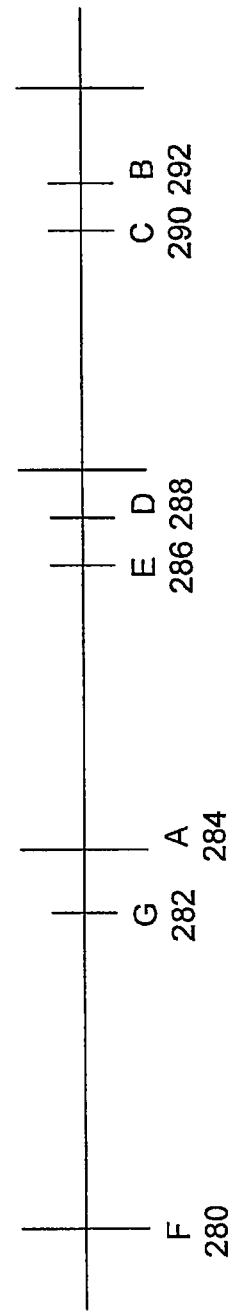

SYSTEM AND METHOD FOR PERSONAL VIDEO RECORDING

CROSS-REFERENCE TO RELATED APPLICATION(S)

This present application is a continuation of U.S. patent application Ser. No. 09/974,427 filed Oct. 9, 2001, which claims the priority of U.S. Provisional Application No. 60/239,425 filed Oct. 10, 2000 entitled "System And Method For Personal Video Recording," the contents of which are fully incorporated by reference herein.

FIELD OF THE INVENTION

The present invention relates generally to the decoding and presentation of digital audio-video streams, and more particularly to a system and method for implementing "trick modes" of personal video recording (PVR), such as, for example, fast forward play and reverse play at various speeds for digital audio-video streams.

BACKGROUND OF THE INVENTION

PVR systems offer consumers a hard disk-based VCR-like function that records live TV programs, while offering the versatility of select playback and associated special features. One feature of a PVR system is to provide the consumer with the ability to pause viewing of a live broadcast for a variable length of time while the unit continues to record, and then resume continuous viewing from the point of departure. This feature is typically referred to as time-shifting. Since the programs are recorded digitally, the viewer may also take advantage of trick mode features such as pause, fast forward, slow forward, rewind, slow reverse, skip, and the like.

PVR systems have been gaining popularity with television viewers. Examples of currently available PVR systems include the TiVO system available from Philips Electronics and Sony and the Replay system available from Panasonic. PVR systems from other manufacturers are available as well.

PVR systems typically receive and decode analog video from broadcast sources, compress the decoded video and audio into a digital format such as MPEG, and record the compressed data onto a hard drive. For playback, present systems read and decode the compressed digital video and audio from the hard drive and output the decoded video and audio in an analog format for display.

Using trick mode features such as fast forward and reverse display functions, the viewer may reach a desired point in the broadcast by viewing the video pictures faster than the normal display speed and/or by viewing them in reverse. It is desirable that the PVR systems present the pictures during fast forward and reverse displays with a quality sufficient to allow the viewer to readily locate the desired point in the broadcast. Fast forward display and reverse display may also be referred to as cue and review, respectively.

Present PVR systems typically perform the function of encoding the video into a digital format that allows for cueing and reviewing during playback of the stored contents. However, in digital cable systems, for example, the video is encoded in a digital format before it ever reaches the PVR system. Such a format may not be conducive to enabling cue and review with adequate picture quality when the digitally encoded streams do not have a substantial number of I-pictures, which may include the case of having no I-pictures altogether.

For example, performing trick modes with no-I-picture digitally encoded streams, such as General Instrument/Motorola's progressive refresh streams or streams provided by AT&T's Headend in the Sky (HITS) service, is generally more difficult than with MPEG video using a conventional IBP GOP structure. This is because in progressive refresh streams or HITS streams there are no I-pictures to which the decoder can perform random access.

Therefore, it is desirable to provide a method and apparatus for enabling trick modes when the digitally encoded streams do not have a substantial number of I-pictures.

SUMMARY OF THE INVENTION

The present invention provides a system and method for PVR to record digitally encoded data streams, and to playback and decode the recorded streams. The system applies to all types of digital audio-video streams, whether they have I pictures or not. In a preferred embodiment, the system implements PVR features in conjunction with a digital cable box or other source of digitally encoded video, such as a network server. The system preferably enables "trick modes", including, for example, fast forward and reverse displays at various speeds. Index tables of entry points may be desirable in some modes. These tables point to what may be referred to as E Pictures or "Entry Pictures." The E pictures preferably have one or more I-slices as the first row, the last row, or any other suitable row for starting a pattern of progressive I-slices.

In an embodiment according to the present invention, a method for enabling trick modes for a digitally encoded stream comprising video pictures is provided. The digitally encoded stream is stored. The video pictures, starting from an entry picture, are decoded to generate one or more fully decoded pictures, wherein the entry picture is a non-intra-coded picture. At least one of the fully decoded pictures is displayed.

In another embodiment according to the present invention, a method for enabling trick modes for a digitally encoded stream comprising video pictures is provided. The digitally encoded stream is received. At least one of the video pictures can be fully decoded without decoding any I pictures. The video pictures are decoded at a first decode rate and displayed at a first display rate, wherein the first decode rate and the first display rate correspond to a normal display speed of the video pictures. The video pictures are decoded at a second decode rate, wherein the second decode rate is faster than the first decode rate. The video pictures are displayed at a rate different from the first display rate.

In yet another embodiment according to the present invention, a method for enabling reverse play in a personal video recording system is provided. A digitally encoded stream including video pictures is received. The video pictures are decoded up to a desired picture, starting at an entry picture which is the same as or earlier in the stream than a previously decoded entry picture, and the desired picture is displayed in a reverse sequence.

In a further embodiment according to the present invention, a personal video recording system for storing and playing back a digitally encoded stream is provided. The personal video recording system comprises means for storing the digitally encoded stream, said digitally encoded stream comprising video pictures, at least one of which can be fully decoded without decoding any I pictures, wherein the video pictures are decoded at a first decode rate and displayed at a first display rate, wherein the first decode rate and the first display rate correspond to a normal display speed of the video pictures. The personal video recording system also comprises means for playing back the stored digitally encoded stream; means for selecting an entry point at which decoding of the video pictures starts; means for decoding the digitally encoded stream at a second decode rate, which is faster than the first decode rate, to generate the video pictures; and means for displaying the video pictures at a rate different from the first display rate.

BRIEF DESCRIPTION OF THE DRAWINGS

FIGS. 4A, 4 and 4 illustrate changes to the location of I-slices in a block of pictures (BOP) in exemplary bitstreams without a substantial number of I-pictures;

FIG. 7 is a timing diagram of decoding pictures having a pattern of progressive I-slices in an embodiment according to the present invention;

FIG. 9 is a timing diagram of reverse decoding and displaying pictures having a pattern of progressive I-slices in an embodiment according to the present invention.

DETAILED DESCRIPTION OF THE INVENTION

The present invention provides a system and method for PVR to record digitally encoded data streams and to playback and decode the recorded streams. The system preferably implements PVR features in conjunction with a digital cable box or other source of digitally encoded video, such as a network server. The system may also be used in conjunction with an analog cable box or other sources of analog video.

Figure 1:
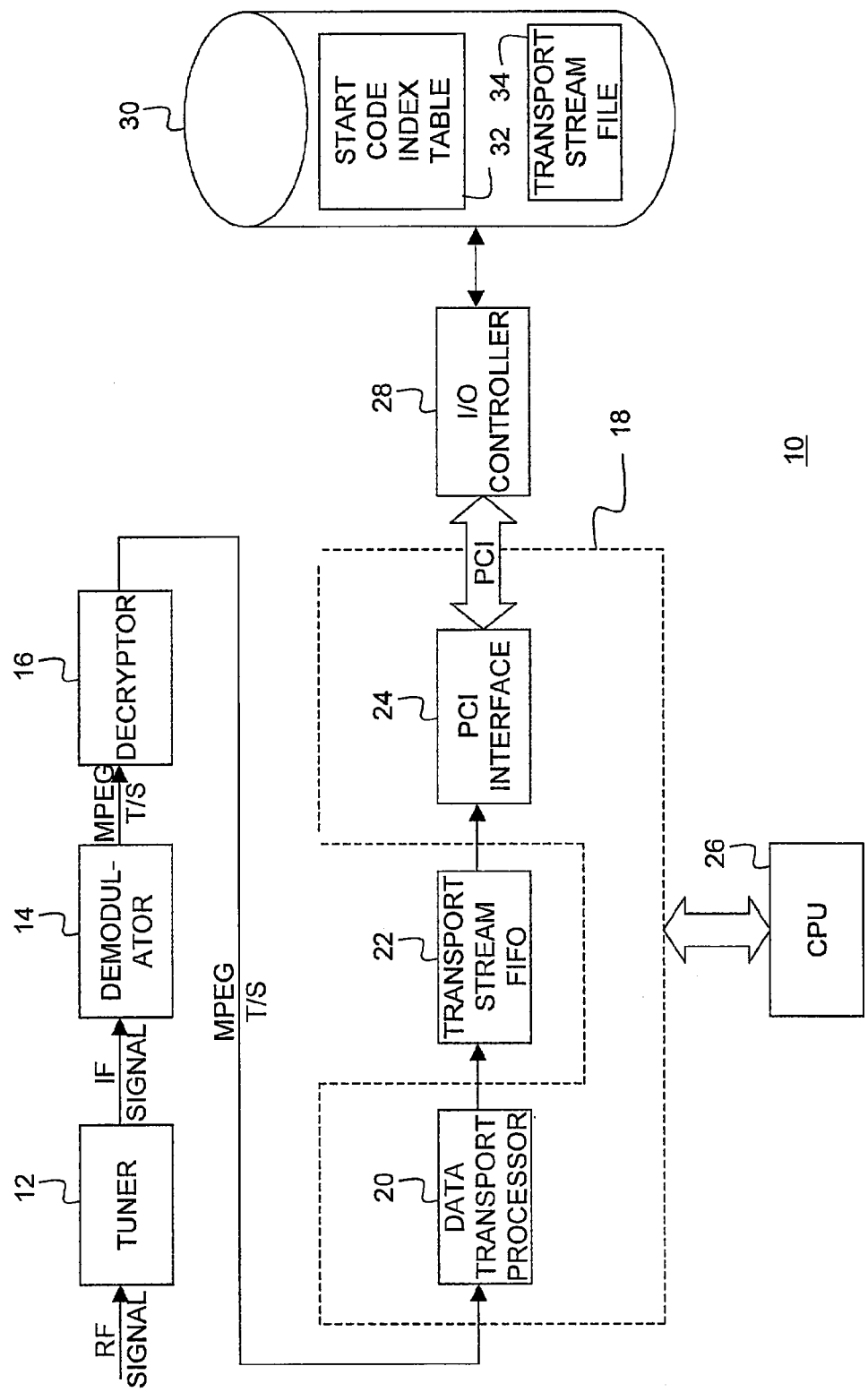
FIG. 1 is a block diagram of a personal video recording (PVR) system, which may be used in an embodiment according to the present invention for digital channel recording.

FIG. 1 is a block diagram of an exemplary personal video recording (PVR) system, which may be used in an embodiment according to the present invention for digital channel recording. In an exemplary PVR digital-channel-recording process, an RF signal containing the selected video service to be recorded preferably is received by a tuner 12.

The selected video service is typically contained in an MPEG Transport Stream (TS) (e.g., MPEG-2 Transport Stream), but may be contained in other format video streams as well. The tuner preferably down converts the channel that contains the TS to IF. A demodulator 14 preferably demodulates the IF to base-band digital data and output the TS to a decryptor 16 for any decryption needs. The MPEG TS provided to the decryptor 16, for example, may have been encrypted using Digital Video Broadcasting (DVB) or Data Encryption Standard (DES) encryption.

The decryptor 16 preferably decrypts the packets of the TS into clear data if the service is authorized. This output MPEG TS preferably is provided to a data transport processor 20. The data transport processor 20 preferably demultiplexes the input Transport Stream and selects only the requested service. The data transport processor then preferably re-multiplexes the requested service into a new Transport Stream and stores it in a TS FIFO 22. The TS FIFO 20 may be implemented in memory, such as, for example, SDRAM.

The CPU preferably controls storing the data from the TS FIFO 22 to a storage device 30, such as, for example, a hard disk drive (HDD). This, for example, may be done using DMA engines which send the data via a PCI interface 24 over a PCI bus to an I/O controller 28 to the storage device 30. The I/O controller, for example, may comprise an I/O chip containing an IDE controller for interfacing with the storage device 30 (e.g., HDD). The data transport processor 20 may also generate a start code index table (SCIT) 32 and store in the storage device 30 in addition to a Transport Stream file 34. The contents of a SCIT and their uses will be described later in this application.

Figure 2:
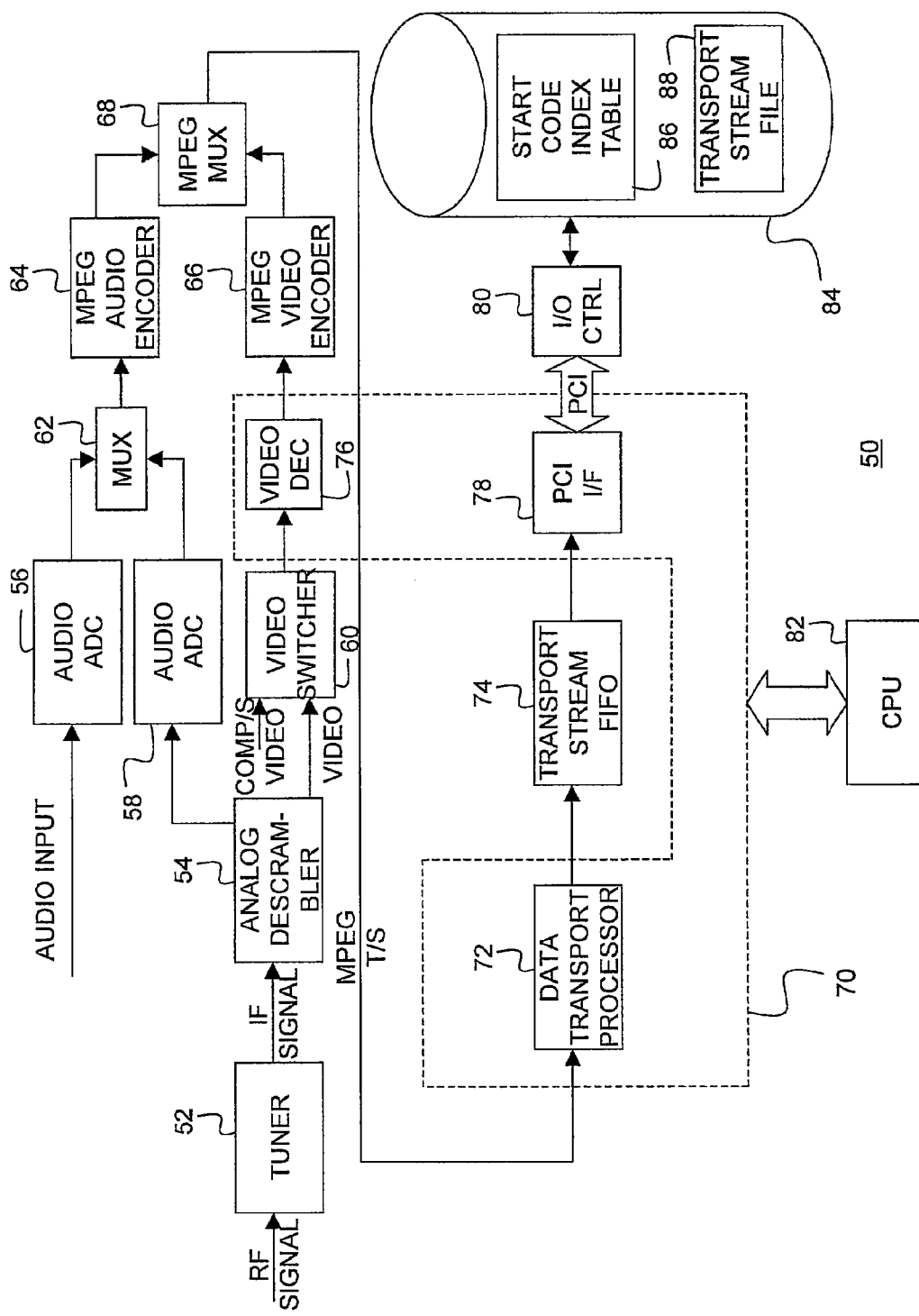
FIG. 2 is a block diagram of a personal video recording (PVR) system, which may be used in an embodiment according to the present invention for analog channel recording.

FIG. 2 is a block diagram of an exemplary personal video recording (PVR) system, which may be used in an embodiment according to the present invention for analog channel recording. As illustrated in FIG. 2, the PVR may accept an analog channel from either a tuner as RF signal or from baseband line inputs on the back panel with a video switcher 60 switching between them.

The analog channel record path for each of these two cases is similar except at the front end of receiving the signal, and the description will be given in reference to the tuner case. A tuner 52 preferably receives an RF signal containing the analog video signal of interest. The tuner preferably down converts the selected channel to generate an IF signal, which preferably is provided to an analog descrambler 54 for demodulation.

The analog descrambler 54 preferably demodulates the IF signal to base-band analog video and audio. If the channel has been encrypted, the analog descrambler may also decrypt the signals provided that it has been authorized. The base-band analog audio preferably is provided to an audio analog-to-digital converter (ADC) 58 for conversion to digital audio. The PVR may also receive an audio input, which may be ADC-converted in an audio ADC 56 to digital audio for multiplexing with the digital audio from the audio ADC 58 in a multiplexer (MUX) 62. The digital audio signals, for example, may be in a form of serial I.sup.2S data streams. The digital audio signal (e.g., I.sup.2S data stream) from the MUX 62 preferably is then provided to an MPEG audio encoder 64 for generation of MPEG audio.

The analog video generated by the analog descrambler 54 may be in a form of composite video, S-video or any standard or non-standard analog video. The analog video may then be provided to the video switcher 60, which may switch between the analog video from the analog descrambler 54 and other analog video (e.g., composite video or S-video) from other sources, e.g., the back panel. The analog video (from the analog descrambler 54 or the video switcher 60) preferably is passed to a video decoder 76, which preferably converts the analog video to an 8 bit parallel data stream, which preferably is then sent to an MPEG video encoder 66 for generation of MPEG video.

The MPEG video and the MPEG audio preferably are then multiplexed by an MPEG multiplexer 68 into an MPEG Transport Stream (e.g., MPEG-2 Transport Stream). The MPEG TS preferably is provided to a data transport processor 72. The data transport processor 72 preferably stores the MPEG TS in a TS FIFO 74. The TS FIFO 74 may be implemented in memory, such as, for example, SDRAM.

The CPU preferably controls storing the data from the TS FIFO 74 to a storage device 84, such as, for example, an HDD. This, for example, may be done using DMA engines which sends the data via a PCI interface 78 over a PCI bus to an I/O controller 80 to the storage device 84. The I/O controller, for example, may comprise an I/O chip containing an IDE controller for interfacing with the storage device 84 (e.g., HDD). The data transport processor 72 may also generate a start code index table (SCIT) 86 and store in the storage device 84 in addition to a Transport Stream file 88.

Figure 3:
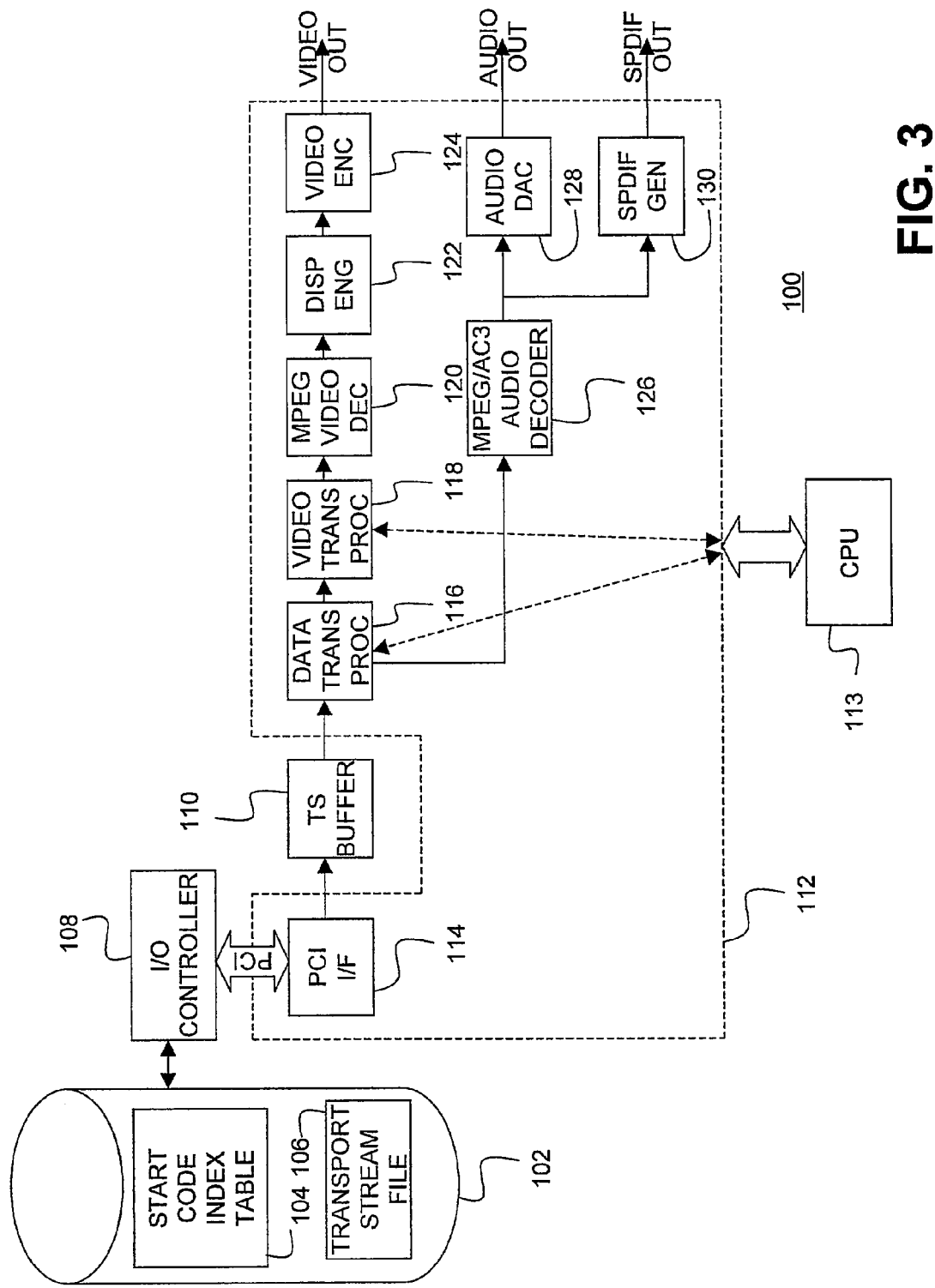
FIG. 3 is a block diagram of a playback system, which may be used to implement an embodiment according to the present invention.

FIG. 3 is a block diagram of a playback system 100, which may be used to implement an embodiment according to the present invention. For a program recorded on a storage device 102 (e.g., HDD), the PVR can play it back as follows:

A CPU 113 preferably reads the TS data from the storage device 102 based on the user selected playback mode. Suitable TS data from a TS file 106 preferably is read into a TS buffer 110 (e.g., SDRAM) using DMA engines over a PCI bus via an I/O controller 108 and a PCI interface 114. The I/O controller, for example, may comprise an I/O chip containing an IDE controller for interfacing with the storage device 102.

A data transport processor 116 preferably de-multiplexes the TS into its constituents and passes the MPEG audio (i.e., audio Transport Stream) to an audio decoder 126 and the MPEG video (video Transport Stream) to a video transport processor 118 and then to an MPEG video decoder 120. The MPEG video decoder 120 may also be referred to as a video decoder or as a decoder. The MPEG video decoder 120 may also be referred to as an MPEG-2 video decoder when used to decode MPEG-2 video streams. The CPU 113 may control the data transport processor 116 and/or the video transport processor 118 to implement trick modes (e.g., pause, fast forward, slow forward, rewind, fast reverse, slow reverse, skip).

In order to support trick modes during playback, the MPEG video decoder 120 preferably has a way to randomly access the recorded Transport Stream (e.g., TS file 106) stored in the storage device 102 to retrieve the correct TS data. The MPEG video decoder 120 preferably should also be able to maintain its real time display by limiting the data transferred to only those data that are required for building the pictures corresponding to the selected trick-play mode. One way to achieve this is to mark certain entry points in the stream that would efficiently allow a complete picture to be decoded. The CPU 113 could then compute the next entry point of the stream based on the current trick mode, its current location, and the set of possible entry points.

The collection of data points that include entry points for a video stream forms a Start Code Index Table (SCIT) 104, which may also be referred to as an index table, and may be stored in the storage device 102 along with the TS file 106, which contains compressed video data. The index table preferably provides information about the location of all the non-slice start codes (including PES Start codes) and the first slice code following a non-slice start code in a record buffer.

In an embodiment according to the present invention, a data transport driver (DTD) which preferably runs in the CPU 113, preferably is responsible for data flow of the stream to be played back through the data transport processor 116 and/or the video transport processor 118. The DTD in this embodiment also preferably inserts a command transport packet containing various commands to the video transport processor 118 and the video decoder 120. The inserted transport packet preferably contains command fields for controlling the data flow of the MPEG video stream during play back, and there may be several options for uniquely identifying the command transport packets.

For example in one embodiment, the CPU 113 preferably indicates the PID number of the command transport packet to the video transport processor 118 so that it can parse the command structure accordingly. But when this option is used, the firmware flow (e.g., of the video transport processor 118) may have to be disturbed to accommodate handling of such PID numbers.

For another example in another embodiment, the PID number of the command transport packet preferably is the same as the video PID number. In this embodiment, the command transport packet preferably contains adaptation field only and no payload. The command structure preferably is placed in a private field of the adaptation field. A 32-bit signature may uniquely identify this packet as a command transport packet.

In other embodiments, various different software, hardware and/or firmware available to those skilled in the art may be used to provide commands to the data transport processor 116, the video transport processor 118 and/or the video decoder 120 to implement and control the trick modes. These other embodiments may or may not use command transport packets to effect command and control.

The audio decoder 126 preferably sends digital audio to an audio DAC 128 for digital-to-analog conversion (DAC) to generate analog audio and outputs the analog audio. The audio decoder 126 may also output the digital audio to a SPDIF generator 130 to generate a digital audio output (e.g., SPDIF stream).

The MPEG video decoder preferably sends the decoded video to a display engine 122. The display engine 122 preferably is responsible for scaling the video picture, rendering graphics, and constructing a complete display. Once the display is ready to be presented, it preferably is passed to a video encoder 124, which may include a DAC for outputting the video as an analog video. The video encoder 124 may also output the video in digital format, e.g., digital visual interface (DVI)-compatible format.

The present invention preferably applies to all types of digital audio/video streams, whether they have I pictures or not. The present invention may be used with streams that have no I pictures (no-I-picture streams) and that have, for example, a progressive refresh pattern of using intra-slices (I-slices). It may also be used with streams that have at least one, but an insubstantial number of I pictures. The system preferably enables trick modes including fast forward and reverse displays at various speeds, and preferably produces an adequate representation of the video during the trick modes of operation. The system may be used with analog audio/video streams as well with appropriate encoding to digital format prior to storing.

The present invention may be used with both conventional video streams or no-I-picture streams. The term "no-I-picture stream" as used herein may refer to one or more types of video streams in which at least one picture can be fully decoded without decoding any I pictures. For example, no-I-picture streams may include streams with absolutely no I pictures (e.g., progressive refresh stream or progressive refresh encoded stream), video streams with a non-regular occurrence of I pictures, and video streams without a substantial number of I pictures, such as a video stream with a single I picture at the beginning of the stream but without any subsequent I pictures and/or a video stream with sporadic occurrence of I pictures.

In streams that do have a substantial incidence of I-pictures, for example, trick modes can be accomplished by having the decoder decode only I pictures. This requires I pictures to be sufficiently closely spaced in the stream that trick modes using only I pictures can produce acceptable video quality to the user. In no-I-picture streams, I pictures do not occur with sufficient frequency and regularity in the stream to support trick modes with adequate video quality while using only I pictures.

I. Exemplary No-I-Picture Progressive Refresh Coding Structure

The system may receive MPEG video, which has been coded using a progressive refresh coding structure. The progressive method is also known as all-P even though it may also include B-pictures. In common practice, it is a no-I-picture stream having absolutely no I pictures, with some additional constraints. The HITS (Headend In The Sky) system often uses the progressive refresh coding structure, so sometimes progressive may be referred to as HITS for brevity, although HITS does not necessarily mean progressive refresh, nor are all progressive refresh streams from the HITS system. Progressive coding is specified as one mode that General Instruments/Motorola encoders operate. Progressive coded streams are proper MPEG-2 video streams, with some special constraints.

Progressive coding in one embodiment may be described as follows:

1) There are no I pictures. This means that there are no pictures that can be decoded completely without depending on other decoded pictures.

2) There are P pictures (predicted pictures), and optionally there may be B pictures (bi-directional pictures).

3) Within P pictures, there are some rows that are coded as intra-slices (I-slices). Rows and slices are defined in the MPEG-2 video standard, ISO/IEC 13818-2. There is a specified pattern for coding I-slices described in the present application. The embodiments of the present application preferably are capable of supporting PVR of various different pattern for coded I-slices.

4) Anywhere from 1 to 9 rows are encoded as I-slices in each P-picture; this number may be referred to as refresh depth. A typical default setting for the encoder, for example, is M=3 (PBBPBBPBB pattern) and refresh depth of 6.

5) I-slices follow a consistent pattern; this applies only to P pictures, not to B pictures. FIG. 4A illustrates the pattern of I-slices where the I-slices appear sequentially from top to bottom. For example, if the value of refresh depth is set to an integer D, the first D rows of a first picture 150 are I-slices. The remaining rows typically are predictively coded, i.e. P-slices, even though it is possible for the remaining rows to include I-slices in case all macroblocks happen to be intra coded.

In the next picture 152, the first D rows are not I-slices, and the second D rows are. In the 3.sup.rd picture 154, the first 2*D rows are not I-slices, and the 3.sup.rd D rows are. This continues until all rows in the consecutive sequence of pictures 156, 158 have been represented in I-slices. In addition, there is a constraint on motion vectors.

For each picture where the I-slices are not at the top of the picture, the motion vectors are constrained to point only at rows that are at the same vertical height or higher, that is, they can only point at rows that have been refreshed via I-slices since the most recent picture with the first row being an I-slice.

The location of the I-slices need not move from top to bottom as in the progressively refreshed bitstream illustrated in FIG. 3A. For example, the location of the I-slices may move from bottom to top as illustrated in pictures 160, 162, 164, 166 and 168 of FIG. 4B. The I-slices may also move from center to top and bottom as illustrated in pictures 170, 172 and 174 of FIG. 4C. Other patterns of I-slices may be used in other embodiments according to the present invention.

In order to perform random access into a progressively refreshed bitstream, if the decoding starts with a picture whose first row is an I-slice (e.g., the sequence of FIG. 4A), then successive P pictures can be decoded until a picture is decoded where the bottom row is an I-slice, and from that picture on, the resulting pictures are fully decoded and capable of being presented.

In an exemplary embodiment, a picture whose first row is an I-slice may be referred to as an entry picture or an E picture. In other embodiments, the E picture may have an I-slice as the last row or at any other row to start a progressive refresh pattern. A set of pictures starting with an entry picture and ending with the last picture before the next E picture may be referred to as a block of pictures (BOP). The last picture in a BOP is the first fully decoded picture in the BOP.

If a random access starts anywhere other than at an E picture, there is no value in decoding the pictures before the next E picture, since the picture before the first E picture cannot be fully decoded, since some or many of the rows may need to be predicted from, or the prediction predecessors may be predicted from, macroblocks that were never decoded. Therefore, in a preferred embodiment, the most efficient method for performing random accesses into a progressive stream is to always start with an E picture.

II. Index Tables

The index tables preferably are built by a transport processor (e.g., the data transport processor 20 of FIG. 1) and stored in a storage device (e.g., the storage device 30 of FIG. 1). The transport processor preferably scans the Transport Stream to find significant entry points (e.g., I pictures or E pictures), possibly with the assistance of the host, at the time the Transport Stream is being recorded for later play back.

Index tables may be used with all stream types, whether or not they have any I pictures. However, the index tables are of particular importance during implementation of trick modes for no-I-picture streams, especially when some data is skipped during trick modes, since keeping track of E pictures simplifies the process by which the digital video decoder determines where to start decoding. Therefore, the use of index tables will be described in reference to no-I-picture streams with the understanding that those skilled in the art will appreciate how this description can be modified for the case of video streams having regular occurrence of I-pictures.

A. Benefits of Index Tables

In order to perform reverse play of no-I-picture streams with predictable order and rate of pictures, and reasonable efficiency, decoding preferably starts from carefully chosen entry points. In the case of no-I-picture video, the preferred entry points are called "entry pictures" or E pictures. In the case of video with sufficiently regularly placed I pictures, I pictures may be used as entry points. The remainder of this explanation refers to no-I-picture streams. In order to start decoding from an entry point, the required coded data should be in a buffer ready to be decoded, and the decoder should know where the appropriate E picture is in the buffer. This is facilitated through the use of an index table indicating where these E pictures are, on the disk and in the buffer.

A performance improvement may be realized through use of an index table that indicates the starting location of every coded picture in the bit stream. Only some of the rows need to be decoded in some pictures, for example, the top D (refresh depth) rows of an entry picture, the top 2*D rows from the next picture, and so on. In order for the decoder to skip the rows that do not need to be decoded, and go directly to the next picture, it is preferable that the decoder knows where each picture starts. This information can be obtained from an index table or from a start code (row) table created by the transport processor in a preferred embodiment.

B. System with No Index Table

Alternatively, the system may be implemented without the use of index tables created before playback. It should be noted that all trick modes (FF, reverse, etc.) can be implemented without using index tables in an embodiment according to the present invention. In this alternative method, in the decode process the host preferably obtains data from the hard disk and passes it to the decoder for analysis. Typically the decoder can scan through the compressed data stream and search for picture start codes, slice start codes and other data that help to identify entry points in the stream, much faster than the decoder can perform a full decode of all the compressed video data.

When the index tables are not used, the decoder preferably searches through the video stream to find suitable E pictures. In general, the digital video decoder preferably should be able to search the video stream for E pictures significantly faster than it can decode the compressed video, so the extra time required to search through, for example, up to 30 frames of compressed video is typically significantly less than the time it take to decode a block of pictures (BOP) of a no-I-picture progressive refresh stream.

III. Normal/Slow/Fast Forward

In an exemplary embodiment, to decode no-I-picture video streams in fast forward mode, the compressed video is read from disk, moved to the decoder, and decoded at rates that are preferably faster than the normal picture rate (which corresponds to a normal display speed) by a ratio equal to the desired fast forward ratio. One suitable decoder is contained in the BCM7030 graphics display system, marketed by Broadcom Corporation, Irvine, Calif., aspects of which are described in U.S. patent application Ser. No. 09/641,374 entitled "Video, Audio and Graphics Decode, Composite and Display System," filed Aug. 18, 2000, the contents of which are fully incorporated by reference herein. For example, the MPEG video decoder 120 of FIG. 3 may decode I and P pictures at up to nine times the normal video display rate, which may also be referred to as a normal display speed. The present application may be applied to any other system that provides fast decode, or may be applied to conventional decoders, which may result in a commensurate degradation of picture quality or performance.

If the no-I-picture video stream has B pictures, those pictures may be skipped entirely during the fast forward mode unless they are to be displayed. In general, B pictures do not need to be displayed during fast forwarding, since P or I pictures can be substituted for B pictures at the display. Therefore, when using a decoder that can decode MPEG video at nine times the normal real-time decode rate, the rate at which the decode and display process progresses through the stream may be:

1) 9.times. (nine times the normal real-time decode rate) for streams with no B pictures, and without skipping compressed data.

2) 27.times. (27 times the normal real-time decode rate) for streams with B pictures (M=3, i.e., two B pictures between each pair of P pictures), and without skipping compressed data.

3) Arbitrarily fast rates when some compressed data is skipped.

The fast forward rates of 9.times. and 27.times. without skipping specified in 1) and 2) above are arbitrary, and have been selected for the decoder that can decode MPEG video at nine times the normal real-time decode rate. Depending on the decoder capabilities, the fast forward rates can be 8.times., 9.times., 30.times., 300.times. or other arbitrarily fast rates.

A. Normal or Slow Forward Playback

In normal or slow speed playback, after starting to decode, there may not be a need to identify entry points. Therefore, it may not matter whether there is an index table or not once decoding of the stream has started, and there may not be much difference between the methods of decoding either with or without an index table. Start of decode can begin at any point, which may be the start of a file representing a short clip, or an arbitrarily selected point in the video stream, or a point indicated by any means, including a directory.

The directory, if there is one, need not indicate all or any entry points, and it can point to any point in the stream where a user may be interested in starting the decode, such as the start of a major scene. However, the use of an index table is preferable, as the decoder may be able to produce a fully decoded picture more quickly when decoding starts at an E picture, and an index table can assist by indicating the locations of appropriate E pictures.

In an alternative implementation, the host or decoder scans through the stream starting from any arbitrary starting point and finds the first E picture before decoding; this method also allows the decoder to produce the first fully decoded picture more quickly than starting decoding from arbitrary points in the bit stream.

B. Fast Forward without Skipping Data

In fast forward playback where skipping of data is not required, the methods of decoding either with or without index tables may be similar to each other, since the decoder can process all contiguous compressed data and it may not be necessary for the decoder to know the locations of entry points in the stream. Again, the delay in starting the decode of a stream can be reduced through the use of an index table that indicates the locations of E pictures, or alternatively by having the decoder search through the stream for the first E picture before beginning decoding.

Figure 5:
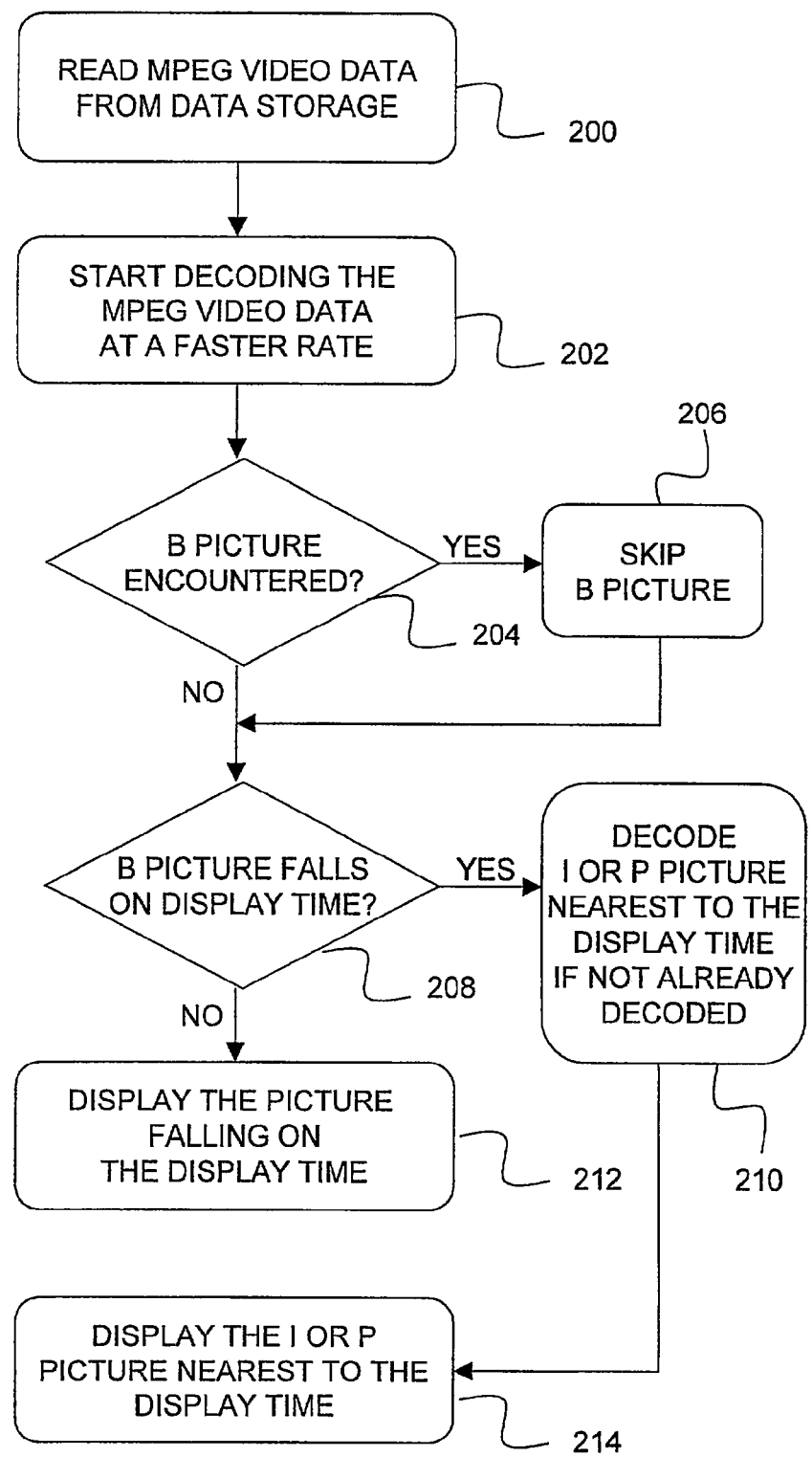
FIG. 5 illustrates a process of fast forwarding without skipping data in an embodiment according to the present invention.

A process of fast forward without skipping data in an embodiment according to the present invention is illustrated in FIG. 5, and described below.

1) As in a typical PVR, the rate of decoding and displaying is preferably driven by the decoder, not by the data source (e.g., data storage device), which in this case may be a hard disk drive (HDD) of a computer. In step 200, the MPEG video data is read from a storage device, such as the storage device 102 of FIG. 3.

2) The MPEG video decoder preferably decodes MPEG video as fast as it can for the desired number of coded pictures per displayed picture. For fast forwarding, the decoding rate may be faster than the normal decoding rate as shown in step 202. For example, for 10.times. fast forward in cases where there are no B pictures, for every displayed picture the MPEG video decoder preferably decodes 10 coded pictures and prepares the last one for display. In cases where the stream has B pictures, when the B pictures are encountered as in step 204, they may be skipped as in step 206 rather than being decoded. Then the pictures falling on the display times preferably are displayed. If the display time falls on a B picture as determined in step 208, the nearest I or P picture may be decoded (if not decoded already) as shown in step 210 and displayed as shown in step 214 instead.

3) As the compressed data is evacuated from the TS buffer (e.g., TS buffer 110) and from the PVR playback buffer (e.g., decode buffer in the MPEG video decoder), stream data is demanded and read from the storage device. The rate of reading data from the HDD is nominally increased from the normal data rate by the fast forward ratio, although this rate is not necessarily constant. Details of decode buffer management and data transfer are described later in this application.

C. Fast Forward with Skipping Data

In this case, the decoder preferably does not decode all of the contiguous compressed data (in addition to potentially skipping B pictures if they exist); rather, it skips some compressed data between instances of decoding pictures. One main reason the decoder would do this to obtain higher fast forward rates than would otherwise be possible with decoding of all contiguous data of the stream, due to limitations in the performance of the hard disk drive, system memory, decoder, or other parts of the system. The decoder may benefit from knowing where to re-start decoding after skipping data. In a preferred method, an index table is used to locate significant entry points (e.g., E pictures). However, fast forwarding with data skipping may also be implemented without an index table.

1. Using an Index Table

Figure 6:
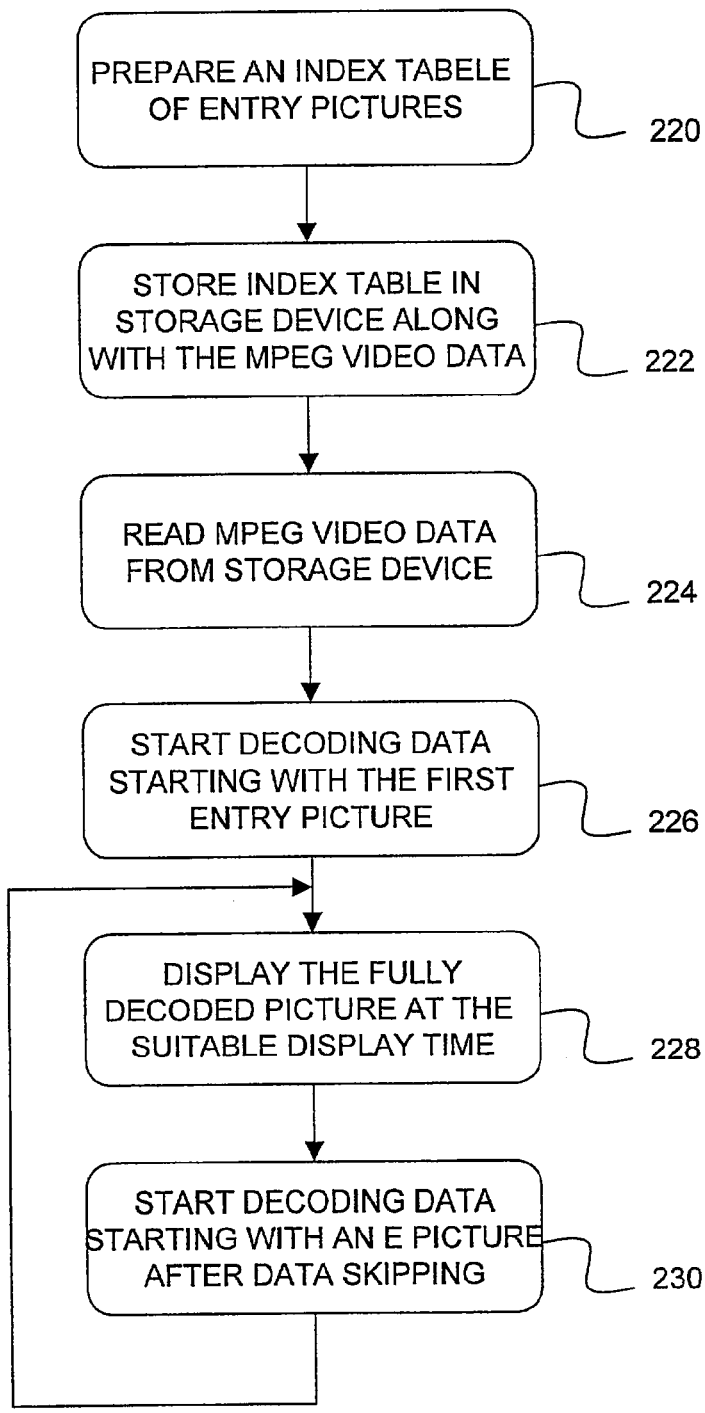
FIG. 6 illustrates a process of fast forwarding with skipping data in an embodiment according to the present invention.

In fast forward at faster rates requiring data skipping, the preferred process is as illustrated in FIG. 6. An index table (e.g., the start code index table 104 of FIG. 3) preferably is used to indicate where the entry pictures are in the compressed stream. The index table, for example, may be prepared in step 220 at the time of recording by a transport processor that receives MPEG bitstreams such as the data transport processor 20 of FIG. 1. The index table preferably is stored in a storage device along with MPEG video data as shown in step 222. Depending on the specifics of the stream, entry pictures may typically be spaced between 15 and 30 pictures apart.

For each picture to be displayed, the data is read in step 224 from the storage device (e.g., HDD 102) and placed in the decode buffer (in the MPEG video decoder), preferably starting with the beginning of an entry picture as shown in step 226. The entry picture and successive pictures preferably are decoded until a completely reconstructed picture (i.e., fully decoded picture) has been produced and is ready for display. The fully decoded picture preferably is then displayed at a suitable display time as shown in step 228. The number of pictures that need to be decoded to obtain one fully decoded picture may typically range, for example, from 5 (refresh depth=6) to 30 (refresh depth=1).

The number of coded pictures that are skipped typically depends on the desired FF rate, as well as on how many fully decoded pictures are decoded and presented each second. For example, if the FF rate is 300.times. and the original content has 30 fps (frames per second), then every second, 300.times.30=9000 frames are passed (decoded or skipped). If the system can display 10 unique pictures per second (10 fps), it progresses through 900 frames for every one it displays. If the stream is constructed such that it requires 30 consecutive pictures to be decoded in order to produce one fully decoded picture after starting from an E picture, then the decoding system would be expected to skip an average of 900−30=870 frames for every one that it displays.

It should be noted that it is not necessary to decode all slices of all pictures. For example, in a progressively refreshed bitstream where the location of the I-slices moves from top to bottom, for the entry picture, only the I-slices (rows) at the top of the picture preferably are decoded. For the second picture, the (2.times.refresh depth) rows at the top preferably are decoded, and so on until I-slices have been decoded at the bottom of the last picture of the BOP. On average, this may allow the decoder to progress through the pictures at twice the rate than it would otherwise, assuming the decoder can find the start of each picture without parsing all of each picture.

Once a BOP, starting from an entry picture and ending with a first fully decoded picture, has been decoded, a BOP that occurs later in the stream preferably is decoded, preferably starting with an entry picture as indicated in step 230. During a skip data mode to get high FF rates, consecutive BOPs typically are not decoded. In fact, the BOP to be decoded, for example, may potentially occur hundreds or thousands of pictures later.

2. Not Using an Index Table

This case may be considered to comprise two separate scenarios: 1) the decoder preferably scans all the compressed data and finds entry points, while decoding only some of the data; 2) the decoder may not scan all the data, and some of the data (e.g., skipped data) may not even be read from the HDD.

In the first scenario, a contiguous compressed data stream preferably is fed to the decoder by the host (e.g., CPU). The decoder preferably first scans all the data that the decoder has in its input buffer at any give time, and finds significant entry points (e.g., E pictures), possibly with the assistance of the host, in much the same way that an index table would be built during record time. It should be noted that when the system receives video streams with I pictures, this process may also consider I pictures as significant entry points.

The locations of the entry points found preferably are recorded by the decoder, and may also be reported to the host. The decoder preferably decodes a picture starting at one entry point, and then skips ahead by one or more entry points and decodes starting at another entry point, using a location just previously found. The process preferably repeats as long as indicated by the host.

The selection of an entry point at which to start decoding each time may be made by the host, using the entry points just found and indicated to the decoder via an API, or it may be made by the decoder, responding to a more general command from the host such as "play fast forward at 20.times. normal speed". In the latter case the host may not need to know the locations of the entry points.

In the second scenario, i.e. when the decoder does not receive and/or scan all of the contiguous data, typically the host retrieves compressed data from the storage device (e.g., HDD) according to some pattern, which may be arbitrarily unrelated to the location of entry points in the stream. For example, the host may retrieve one complete cylinder of data from an HDD, then skip a cylinder, then read the next cylinder, etc.

The data that is fetched from the HDD preferably is passed to the decoder. The decoder preferably then scans the data as above, searching for entry points. The decoder preferably decodes starting at entry points just found. Alternatively, the decoder may not scan all the data it receives, rather it may decode from the beginning of each block of data received and decode until it has decoded a fully decodable picture; however this method may be less efficient in terms of decoder performance.

The main drawback to performing fast forward while skipping data on the HDD is that the temporal spacing of the pictures that are retrieved, decoded and displayed may not be uniform, resulting in unevenness of motion in the displayed result. On the other hand, skipping entire cylinders, for example, may be an efficient way of retrieving the compressed data stream from the HDD very quickly.

IV. Reverse

The PVR system in an embodiment according to the present invention preferably provides for trick mode PVR with no-I-picture streams in reverse, from slow speeds such as 1.times. to higher speeds. Decoding of MPEG video typically progresses forwards, even when the desired direction of pictures to be displayed progresses backwards.

In an embodiment according to the present invention, a method of implementing reverse display involves starting at entry pictures, decoding forward until the desired fully decoded picture is reached, and displaying the resulting picture while again decoding a portion of the stream, stopping the decode process at an earlier picture, and possibly starting the decode process from an earlier coded picture if necessary to achieve a fully decoded picture. It may or may not be possible to achieve 30 unique displayed pictures per second with a 1.times. reverse play rate; this depends on the structure of the video stream, including the refresh depth, and the decode performance.

A. Reverse Play Process

Figure 8:
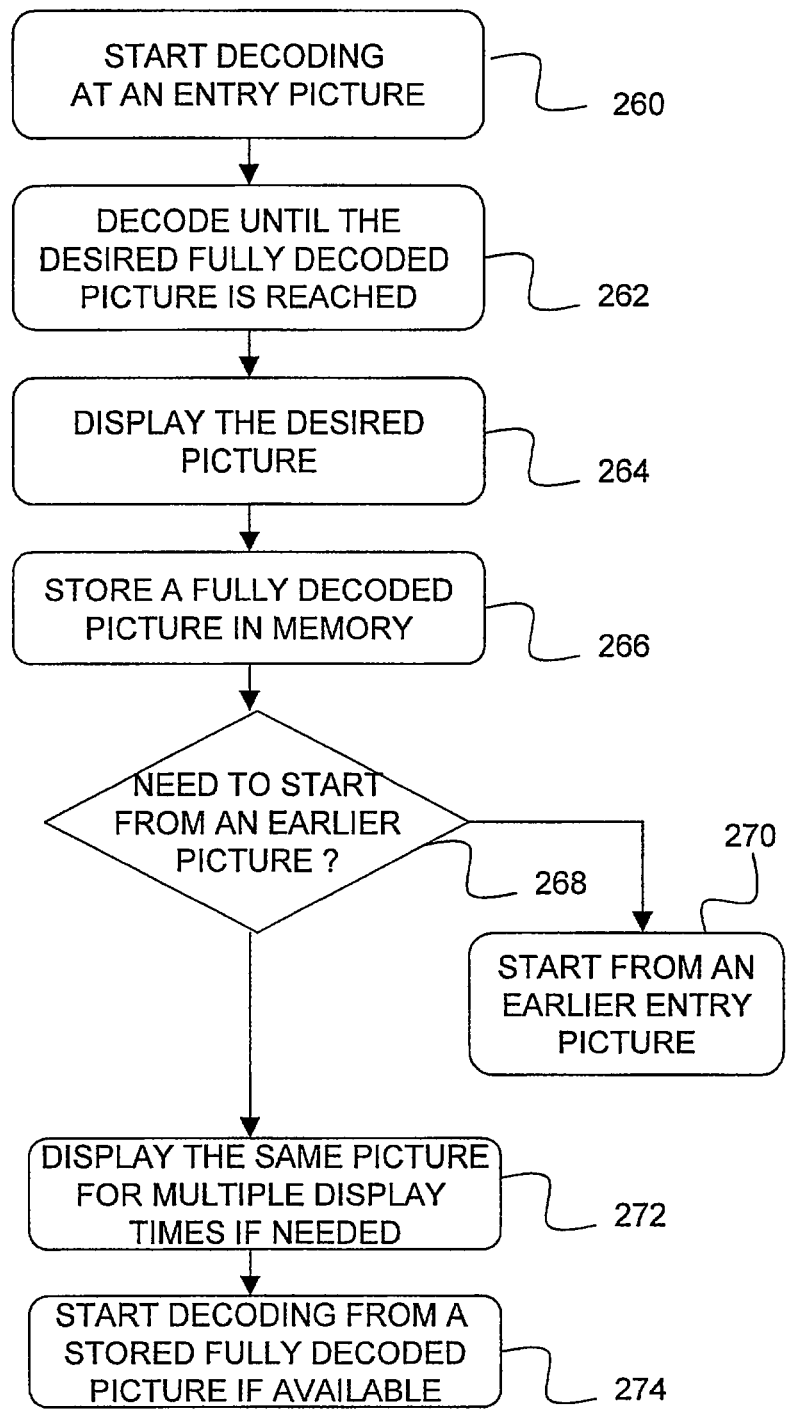
FIG. 8 illustrates a process of reverse displaying in an embodiment according to the present invention.

The process is illustrated in FIG. 7 and the flow diagram of FIG. 8 as follows:

1) Begin decoding at an entry picture as indicated by the index table (entry picture A in FIG. 7) in step 260 of the process in FIG. 8. This entry picture may precede the first picture that can be displayed by, for example, a difference of 4 to 29 pictures, depending on the refresh depth and the value of M (one more than the number of consecutive B pictures between consecutive P or I pictures). Further, there may be another entry picture between the first entry picture to be decoded and the picture desired for display, but if decoding starts with the second entry picture, the result would not be a completely decoded picture. For example, to obtain a fully decoded desired picture 246 of FIG. 7, the first picture to be decoded should be the entry picture A 240 and not the entry picture B 244. Otherwise, the rows below the shaded rows of the desired picture 246 may not be able to be decoded.

2) Then the process proceeds with decoding forwards from the entry picture until the desired picture has been decoded in step 262, and display the result in step 264. B pictures may not have to be decoded, unless the picture to be displayed is a B picture. Even then, a P or I picture nearest the desired B picture may be decoded and displayed instead of the desired B picture. Further, it should be noted that not all slices need to be decoded, just as in the case of fast forward at high rates while skipping data. Decoding only the necessary slices may approximately double the average decode rate.

3) The compressed data is preferably retained in a DRAM buffer after it has been decoded since it may be decoded again. For example, all pictures from an entry picture leading up to the next picture to be displayed, which preferably is an earlier picture in the display sequence than the currently displayed picture, may be decoded in order to decode and display the next picture.

4) Optionally, and for best performance, one intermediate fully decoded picture can be stored in memory as shown in step 266 to facilitate the decoding of future pictures. The picture to be stored preferably is the last picture in the first block of pictures, starting with the first entry picture, before the 2.sup.nd entry picture. This preferably is the same as the first fully decoded picture 242 as illustrated in FIG. 7.

5) Once the first picture has been displayed, again begin decoding, either from the same entry picture as before (e.g. the entry picture A 240), or from the entry picture that precedes that entry picture. The same entry picture as before is used again if the final decoded picture can be completely decoded, as determined by the structure of the bit stream, but if this is not possible, then decoding starts at the next earlier entry picture. For example, it is generally not possible to completely decode and display a picture between the entry picture A 240 and the first fully decoded picture 242 if decoding starts at the entry picture A in FIG. 7. To completely decode any picture between the entry picture A 240 and the first fully decoded picture 242, the decoding preferably should start at an entry picture earlier than the entry picture A 240.

6) The process repeats for each picture to be displayed. Since decoding of the requisite number of pictures may take more than the display time of a picture, the currently displayed picture may be displayed for 2, 3 or more picture periods as illustrated in step 272. For each decode sequence, the entry picture where the decoding process starts may be the same as, or an earlier entry picture than the previous one, as required to ensure a correctly decoded picture results.

7) If the optional method is implemented whereby the first fully decoded picture 242 is stored as an intermediate picture (e.g., as in 4) above), the successive pictures in reverse order can be decoded by starting from the entry picture following the intermediate picture (start from Entry Picture B 244 in FIG. 7) and proceeding to the picture to be displayed, e.g., the desired picture 246.

In other words, the intermediate picture may be used to avoid having to decode the same BOP again. For example, if picture 242 is stored the first time it is decoded, and if 246 is the first picture displayed, and if 244 is the second picture that is to be displayed, 244 can be decoded starting from 242, rather than starting from 240. Starting from 242 saves decoding time, since the decoder does not have to decode pictures 240 through 242 again.

It should also be noted that additional decoding time can be saved if additional fully decoded pictures are stored. Any number of decoded pictures can be stored, up to an including all decoded pictures. This allows the implementation to trade off memory size for storage against performance. Decoded pictures that have been stored can either be displayed, if they are desired for display, and/or they can be used to decode subsequent pictures, again saving decoding time.

This may result in a substantial reduction in the amount of decoding that is required to produce some pictures for display. However, once the reverse play progresses past the decoded reference picture(s), decoding generally must start again from a new, earlier entry picture as indicated above.

B. Scenario for Reverse Play

FIG. 9 illustrates exemplary decoding for reverse play by the system. The first picture to be displayed is picture B 292 in FIG. 9. In order to decode picture B 292, decoding should start from picture A 284, an E picture, also labeled "E picture 2". In order to display picture C 290, the decoding should again start from picture A 284 and continue through picture C 290. This process preferably repeats until picture D (the last picture in the BOP starting with picture A 284) has been decoded and displayed. In order to decode picture E 286, decoding should preferably start at picture F 280, an E picture 1, which is earlier than the picture A 284, and proceed forwards up to picture E 286.

In order to display one new picture in reverse order, the complete previous block of pictures (BOP) starting from an entry picture (E picture) generally must be decoded (the B pictures, if any, do not need to be decoded), in addition to all of the P pictures leading up the picture to be displayed.

An optional technique that can save a substantial amount of decoding in some cases, involves the expense of one additional frame buffer. In FIG. 9, if picture D 288 (the last picture of the BOP starting with picture A 284) is stored during the first decoding pass starting at picture A 284, then decoding of picture B 292 can start using picture D 288 as a reference and decoding the successive pictures until picture C 290 is decoded. For each picture before picture C 290 and after picture D 288, decoding can start with picture D 288 once picture D 288 has been fully decoded. After picture D 288 has been displayed, decoding should preferably start at picture F 280 in order to decode and display picture E 286. If the decoded version of picture G 282 is stored in a frame buffer, the process can repeat for pictures before picture E 286, and so on. It should be noted that decoding can begin earlier; it is not necessary to wait until, for example, picture D 288 has been displayed to start decoding at picture F 280. Since the amount of decoding required in order to display a picture can vary from picture to picture, the decoder may be able to increase its average performance by beginning decode earlier in some cases such as this.

C. Reverse Play without Skipping

Similar to the case of fast forwarding without skipping, in this case the host preferably feeds all of the compressed data to the decoder, and the decoder preferably scans the data searching for entry points. Of course, since this is reverse play, the data is typically fed to the decoder in blocks, with each block being fed in forward order, and succeeding blocks starting earlier in time, i.e. the order of the blocks themselves preferably is reversed from normal forward play. In this context a block may be a set of data that was read from the HDD. The size of a block may or may not be related to the sizes of sectors or cylinders of the HDD, and the size of a block may be unrelated to the locations of pictures in the compressed video data stream.

As the decoder finds entry points, it preferably keeps a record of them, and optionally passes this information to the host. As above, the decoder preferably performs decoding in a way that produces reverse play at the desired speed. In the case of progressive-I slice streams (no-I-picture streams), decoding succeeding pictures for display may require decoding the same data multiple times, starting at the same E picture. After some number of decoding passes starting at the same E picture, the decoder preferably begins decoding at the next earlier E picture.

The identification of which E picture (or other entry point e.g. I picture) at which to start decoding may be made by the host, using the locations of the entry points just found and communicated by the host. The identification of which E picture to start decoding may also be made by the decoder via an API indicating abstractions such as "start decoding at the next earlier entry point" or more abstract commands such as "play in reverse order at 1.times. speed", leaving more decisions up to the decoder. When the decoder scans the compressed data and finds entry points, it preferably indicates the addresses of these entry points to the host, and for decoding and display the host preferably indicates the starting point for each decoding pass.

D. Reverse Play with Skipping

This case may be similar to that of fast forward with skipping, with a few differences. The main difference may be the operation when the compressed video stream is a no-I-picture stream (e.g., HITS stream). Similar to the case of fast forward with skipping, in one embodiment, all the data may be fed to the decoder (albeit with the blocks in reverse play order); and in another embodiment, all the data may not be fed to the decoder and/or read from the hard disk.

Data preferably is fed to the decoder in blocks. The decoder preferably scans through the data and searches for entry points. Searching preferably is performed in the forward order of the data stream. The entry points found preferably are recorded, and optionally reported to the host.

The decoder may decode one or more pictures starting at each entry point, particularly in the case of no-I-picture streams. Succeeding entry points preferably are in the reverse order from normal play. The decoder may start decoding from non-consecutive entry points in order to implement faster reverse play speeds. The host preferably indicates the location from which to start decoding for each decode pass, using the location of entry points searched by the decoder and communicated to the host. In other embodiments, the entry points from which to start decoding may be specified by the decoder.

The data blocks fed to the decoder may make up a contiguous data stream (even though the blocks are in reverse order, so the data is not received contiguously), or it may make up a non-contiguous stream, i.e., with sections of data skipped between blocks. This would typically occur if the host does not read all the data from the HDD, e.g. in order to implement faster speeds of reverse play.

The operation may essentially be the same whether or not data is skipped as it is fed to the decoder, except that if data is skipped there may be entry points from which no pictures can be fully decoded, especially in the case of no-I-picture streams if the last picture in a BOP is not fully contained within the blocks of data sent to the decoder.

The decoder or (preferably) the decoder in conjunction with the host may find and examine entry points within the compressed bit stream, and decide which entry points can productively be used for decoding. The host preferably directs the decoder at which entry points to start decoding via an API. Alternatively, the decoder may decide at which entry points to start decoding.

V. Compressed Data Buffer Management

For PVR playback, whether the stream is a GOP structured stream with I pictures, or a no-I-picture stream (e.g., progressive I-slice (HITS) stream without I pictures), management of compressed data buffers is important, especially for fast forward and reverse play.

One or more of the following principles and guidelines may assist in the design of the system:

1) It typically is acceptable to interrupt the host once per display field time and to expect the host to answer each interrupt within one field time, but it may not be reasonable to expect very fast interrupt response from the host.

2) Compressed data preferably is laid out on the storage device (e.g., HDD) in ways that are suitable for the storage device design and for high performance of the storage device. Therefore, any alignment of compressed pictures with disk sectors (of the HDD) should not be assumed. For example, any compressed picture may span two or more sectors.

3) Memory buffers in the host, which hold data read from the HDD, preferably are designed for system efficiency and performance. The size of these buffers is preferably a power of 2, and they preferably are designed to align well with HDD sectors. Therefore any compressed picture may span two or more buffers. Further, any compressed picture may start anywhere within a buffer.

4) For some trick modes, such as fast forward at rates beyond the maximum rate the decoder can support while decoding contiguous data, and for reverse play, it may be necessary for the host to skip sectors on the HDD, and it may be necessary for the decoder to skip some data in some buffers or to skip some buffers entirely.

5) Video decoders normally have compressed data buffers (CDB); there may be a significant difference between the time compressed data enters the CDB and the time that same data is decoded and possibly displayed. Data generally should be moved from a source, e.g. the host's data buffers, into the decoder's CDB, before the data can be decoded. Moving data into the CDB may be done by the decoder alone, by the host or other device, or by a combination of these devices. The preferred solution is for the decoder to move the data from the host buffers into the CDB. It is possible for a decoder's CDB to be the same memory that makes up the host's buffers (i.e. for HDD access), but this is not preferred.

6) The compressed data stored on the HDD may be Elementary Streams (ES), sequences of PES packets, Transport Streams (TS), or possibly modified versions of any of these or other formats.

In view of the above factors, the compressed data buffers preferably are managed using a linked list of buffers. Each buffer preferably is of some power of two size, such as, for example, 32 kB or 64 kB. Larger logical buffers may be constructed by linking buffers together. Smaller logical buffers may also be created by using portions of the fixed size buffers and pointing to the required data.

The linked lists preferably are constructed through the use of a descriptor list, where each descriptor points to a buffer and to the next descriptor. In one embodiment, video Elementary Streams (ES) preferably are stored on the HDD, put into host buffers, retrieved by the decoder, and decoded. The Elementary streams may be modified from the standard MPEG definition, e.g. to include PTS and DTS time stamp information, and possibly PCR or SCR or equivalent time stamp information.

In another embodiment, Transport Streams (TS) preferably are stored on disk and played from disk. Data transport hardware (outside of the decoder proper) preferably records data to memory and plays data from memory using the linked list buffer structure. For record, this hardware preferably can perform searching of key data elements to create index tables, and it may also scramble or encrypt the data to be recorded, after optionally descrambling (or decrypting) the scrambling applied to the data before it is received, typically the network conditional access scrambling. For playback, this hardware preferably can descramble the data and pass data to the decoder, including optional flow control to avoid buffer overflow in the decoder.

There are at least two implementations that may be desired. In one embodiment, the video decoder preferably pulls data from the buffers, using the linked list to direct the addressing of the buffers. In another embodiment, a data transport may be used to retrieve data from the linked list buffers and feed it to the video decoder. The same linked list structure with the same descriptor list may be used in both embodiments.

A. Linked List Definition

Linked lists preferably are controlled using a list of buffer descriptors. The buffer descriptor format in an embodiment according to the present invention preferably is as indicated in Table 1 below. However, the buffer descriptor format may be different in other embodiments, and those skilled in the art would appreciate that any of a variety of suitable formats may be used.

TABLE 1

Buffer Descriptor Format for Linked Lists

| Word | Element | Bits | Description |
|---|---|---|---|
| 0 | reserved | 31:26 | Reserved |
| 0 | Start Address | 25:0 | This is the buffer start address. It is a byte address. Byte resolution is to be supported. |
| 1 | reserved | 31:26 | Reserved |
| 1 | Buffer Length | 25:0 | This is the buffer length in bytes. Byte resolution is to be supported. |
| 2 | Interrupt Enable | 31 | If this bit is high, an interrupt is generated when the record/playback circuit has finished processing this descriptor |
| 2 | reserved | 30:0 | Reserved - This could be used as an interrupt count value if that feature is needed. In the BCM7030, playback circuit only interrupts at the end of a buffer playback. |
| 3 | reserved | 31:26 | Reserved |

TABLE 1-continued

Buffer Descriptor Format for Linked Lists

| Word | Element | Bits | Description |
|---|---|---|---|
| 3 | Next Descriptor Address | 25:4 | This is the DRAM address of the next descriptor. It is a 16 byte aligned address. Descriptors can only begin at 16-byte aligned addresses (i.e. bits 3:0 of the address are 4'h0, and are not part of the descriptor field). |
| 3 | reserved | 3:1 | Reserved |
| 3 | Last Descriptor Indicator | 0 | This field is programmed with the value 1'b0 when the Next Descriptor address is valid. This field is programmed with the value 1'b1 when this is the last descriptor in the link list. |

B. Playing from Buffers on playback from linked list buffers, there are several distinct cases that should be considered:

1) Forward direction playback of contiguous data. This includes normal speed play, slow forward play, pause, and fast forward play using the method of decoding at faster than normal rates without skipping data (except that B pictures may be skipped).

In this case of decoding contiguous data in the forward direction, buffer management may be accomplished as follows. The linked list of buffer preferably acts like a FIFO, and in fact this mode may be implemented using a FIFO structure. The decoder preferably starts decoding from some initial entry point, and thereafter it may follow all of the data in the buffers, in order.

The linked list preferably is followed from the first buffer, one buffer after the other, in the order specified in the list. The preferred means to control the decoder is for the host to tell the decoder, via an API call, to start decoding from a specified point in the linked list's descriptor list, which may include an offset into the first buffer. The decoder preferably follows the linked list.

There may be additional API functions for the host to indicate to the decoder the intended decode rate, and functions for the decoder to tell the host its current progress through the stream, where it is currently in the linked list, and other information. The host and the decoder may interact dynamically to adjust such parameters as the desired decode rate, either to adapt to an inability of the decoder to maintain a desired rate, or to change the intended rate of play.

2) Fast forward playback while skipping data. In this case the decoder preferably skips some data that is on the hard disk, and in general it skips some data that is in the buffers. For example, I frames may be decoded while ignoring the pictures that intervene between I frames. Further, some blocks of pictures (BOPs) may be decoded while skipping other BOPs.

In this case of fast forward with skipping, the decoder may skip some data in the buffers, and it preferably decodes only selected pictures or sets of pictures (or BOPs). In this method, the host preferably tells the decoder, via an API call, where in the buffer set to start decoding, for every instance in which data is to be skipped. For example, the host may wish the decoder to decode all I pictures, and only I pictures.

Assuming the host has an index table from which it can determine the location within the buffers of the compressed I pictures, the host preferably tells the decoder to decode a first I picture which starts at or following a specified location in a specified buffer in the linked list, and then to decode a second I picture at another location, and so on. The host may tell the decoder to decode one picture, or more than one picture for every specified entry point, and in case the decoder is to decode more than one picture the host may also instruct the decoder to skip some pictures.

The host preferably tells the decoder to start decoding at a specified point in the linked list of buffers, while the decoder preferably stops decoding at a picture that is implied parametrically, rather than a point in the data stream that is spelled out by the host. For example, the host may tell the decoder to stop at the first fully decoded picture (the end of a BOP in the case of a no-I-picture (e.g., HITS) stream, or it may tell the decoder to stop at the Nth picture after the entry point. For no-I-picture streams, the decoder preferably decodes a BOP after each skip.

It typically is most efficient to start decoding of no-I-picture streams at an E picture, and to complete decoding with the first fully decoded picture. It is of course possible to start decoding before an E picture, but this is not preferred. It is possible to continue decoding beyond the first fully decoded picture, in case the desired picture to display is further into the stream. The host preferably uses its knowledge of the decoder's progress through the linked list as well as its progress in decoding the stream in order to know when to indicate to the decoder what to do next. For each instance in which the host instructs the decoder to decode one or more pictures starting from a specified location in a linked list, the decoder may have to follow the linked list through two or more buffers in the list, and it may stop before retrieving all the data from the last buffer in the list.

3) Reverse Play. In the reverse play case, more considerations and complications may come into play. For reverse play using only I pictures, the process may be similar to fast forward with skipping. This may result in very fast, or jerky, reverse play. For smooth normal speed reverse play, the decoder preferably starts at an entry point. An I picture or an E picture may be at the entry point, depending on the stream construction.

The decoder preferably then decodes forward to the desired picture to display, and then decodes again from the same entry point and decodes forward again but stopping at an earlier picture, as described previously in this application. The same compressed data may be re-used during the reverse display process. This may require the behavior of the data buffers to be different from that of a FIFO, in which the data would be discarded after it is decoded once.

Continuing with normal speed reverse play, after decoding some of the same data multiple times, the decoder may begin decoding at an earlier point in the stream, and in some cases it may continue to decode from the earlier data up through some of the later data that has been previously stored and decoded. This process may involve pre-pending coded data to the sequence of data to be decoded (i.e., appending data before the start of the previous data). Both the re-use and the pre-pending of data may be implemented through the use of the linked list of buffers.

The host preferably modifies the descriptor list as required, and for each time the decoder starts decoding from a specified entry point in the buffers, the host preferably directs the decoder to start decoding from a specified point in the linked list. As in the case with fast forward described earlier, the host preferably tells the decoder not only to start decoding from a specified point in the list, but also to stop at a picture that may be indicated indirectly, such as at the first fully decoded picture, or at the Nth picture, or at the Nth picture after the first fully decoded picture.

The decoder may also make use of a fully decoded picture as a starting point for additional decoding, particularly in reverse play of no-I-picture streams. When this feature is implemented, the host preferably directs the decoder to begin decoding at the start of a BOP immediately following the compressed data associated with a previously decoded and stored fully decoded picture, while indicating also the re-use of the stored decoded picture. The host may command the decoder to do this via an API call.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents.

What is claimed are:

1. A method for enabling trick modes for a digitally encoded stream, the method comprising:
    storing the digitally encoded stream, wherein the digitally encoded stream comprises video pictures;
    decoding, when the digitally encoded stream is a no-I-picture stream, less than all slices in the video pictures, starting from an entry picture that is a non-intra-coded picture, to generate a first fully decoded picture for a first block of pictures and a second fully decoded picture for a second block of pictures, wherein one or more blocks of pictures in sequence are skipped before decoding the second fully decoded picture;
    displaying at least one of the fully decoded pictures.

2. The method for enabling trick modes according to claim 1, further comprising:
    locating one or more entry pictures within the stream at the time of storing the stream, and
    storing locations of the one or more entry pictures in a storage device.

3. The method for enabling trick modes according to claim 1, further comprising:
    reading the stored digitally encoded stream, and
    locating one or more entry pictures within the stream.

4. The method for enabling trick modes according to claim 1, wherein decoding comprises decoding contiguous portions of the digitally encoded stream to generate the fully decoded pictures.

5. The method for enabling trick modes according to claim 1, wherein decoding comprises skipping a portion of the digitally encoded stream between two entry pictures.

6. The method for enabling trick modes according to claim 1, further comprising:
    decoding the video pictures up to a desired picture, starting at an entry picture which is the same as or earlier in the stream than a previously decoded entry picture; and
    displaying the fully decoded pictures in a reverse sequence.

7. The method for enabling trick modes according to claim 6, wherein decoding comprises the step of skipping a portion of the digitally encoded stream between two entry pictures.

8. A method comprising:
    storing a digitally encoded stream, the digitally encoded stream comprising video pictures;
    decoding, starting from an entry picture that is a non-intra-coded picture, less than all slices in the decoded video pictures when the digitally encoded stream has no I-pictures or has a non-regular occurrence of I-pictures or does not have a substantial number of I-pictures, to generate a first fully decoded picture for a first block of pictures and a second fully decoded picture for a second block of pictures, wherein one or more blocks of pictures in sequence are skipped before decoding the second fully decoded picture; and displaying at least one of the fully decoded pictures.

9. The method according to claim 8, wherein the digitally encoded stream that has no I-pictures is a progressive refresh stream.

10. The method according to claim 8, wherein the digitally encoded stream that does not have a substantial number of I-pictures has a single I-picture at a start of the digitally encoded stream but has no subsequent I-pictures.

11. The method according to claim 8, wherein the digitally encoded stream that does not have a substantial number of I-pictures has a single I-picture at a start of the digitally encoded stream followed by a sporadic occurrence of I-pictures.

12. The method according to claim 8, wherein the entry picture is a picture having an I-slice as a first row or a picture having an I-slice as a last row or a picture having an I-slice as a row that starts a progressive refresh pattern.

13. The method according to claim 8, wherein decoding comprises decoding contiguous portions of the digitally encoded stream to generate the fully decoded pictures.

14. The method according to claim 8, wherein decoding comprises skipping a portion of the digitally encoded stream between two entry pictures.

15. A method comprising:

storing a digitally encoded stream, the digitally encoded stream comprising video pictures;

determining that the digitally encoded stream has no I-pictures or has a non-regular occurrence of I-pictures or does not have a substantial number of I-pictures;

in response to the determination and starting from an entry picture that is a non-intra-coded picture, decoding less than all slices in the decoded video pictures to generate a first fully decoded picture for a first block of pictures and a second fully decoded picture for a second block of pictures, wherein one or more blocks of pictures in sequence are skipped before decoding the second fully decoded picture; and displaying at least one of the fully decoded pictures.

16. The method according to claim 15, wherein the digitally encoded stream that has no I-pictures is a progressive refresh stream.

17. The method according to claim 15, wherein the digitally encoded stream that does not have a substantial number of I-pictures has a single I-picture at a start of the digitally encoded stream but has no subsequent I-pictures.

18. The method according to claim 15, wherein the digitally encoded stream that does not have a substantial number of I-pictures has a single I-picture at a start of the digitally encoded stream followed by a sporadic occurrence of I-pictures.

19. The method according to claim 15, wherein the entry picture is a picture having an I-slice as a first row or a picture having an I-slice as a last row or a picture having an I-slice as a row that starts a progressive refresh pattern.

20. The method according to claim 15, wherein decoding comprises decoding contiguous portions of the digitally encoded stream to generate the fully decoded pictures.

21. The method according to claim 15, wherein decoding comprises skipping a portion of the digitally encoded stream between two entry pictures.

22. A method comprising:

storing a digitally encoded stream, the digitally encoded stream comprising video pictures;

determining whether the digitally encoded stream has no I-pictures;

determining whether the digitally encoded stream has a non-regular occurrence of I-pictures;

determining whether the digitally encoded stream does not have a substantial number of I-pictures;

in response to the determination of no I-pictures or the determination of non-regular occurrence of I-pictures or the determination of not a substantial number of I-pictures, decoding less than all slices in the decoded video pictures, starting from an entry picture that is a non-intra-coded picture; and displaying at least one of the fully decoded pictures.

23. The method according to claim 22, wherein the digitally encoded stream that has no I-pictures is a progressive refresh stream.

24. The method according to claim 22, wherein the digitally encoded stream that does not have a substantial number of I-pictures has a single I-picture at a start of the digitally encoded stream but has no subsequent I-pictures.

25. The method according to claim 22, wherein the digitally encoded stream that does not have a substantial number of I-pictures has a single I-picture at a start of the digitally encoded stream followed by a sporadic occurrence of I-pictures.

26. The method according to claim 22, wherein the entry picture is a picture having an I-slice as a first row or a picture having an I-slice as a last row or a picture having an I-slice as a row that starts a progressive refresh pattern.

27. The method according to claim 22, wherein decoding comprises decoding contiguous portions of the digitally encoded stream to generate the fully decoded pictures.

28. The method according to claim 22, wherein decoding comprises skipping a portion of the digitally encoded stream between two entry pictures.

* * * * *